US006165609A

United States Patent [19]

[11] Patent Number: 6,165,609

[45] Date of Patent: Dec. 26, 2000

Curatolo

[54] SECURITY COATINGS FOR LABEL MATERIALS

[75] Inventor: Benedict S. Curatolo, Valley View, Ohio

[73] Assignee: Avery Dennison Corporation, Pasadena, Calif.

[21] Appl. No.: 09/183,456

[22] Filed: Oct. 30, 1998

[51] Int. Cl.[7] .................................. C09J 7/02; B32B 7/12

[52] U.S. Cl. .......................... 428/343; 428/916; 428/915; 427/7; 250/365; 250/372; 283/92

[58] Field of Search ..................................... 428/916, 915, 428/355 AC, 343; 427/7; 283/92; 250/365, 372

[56] References Cited

U.S. PATENT DOCUMENTS

| | | | |
|---|---|---|---|
| 4,146,792 | 3/1979 | Stenzel et al. | 250/365 |
| 4,921,280 | 5/1990 | Jalon | 283/88 |
| 4,927,180 | 5/1990 | Trundle et al. | 283/70 |
| 5,042,842 | 8/1991 | Green et al. | 283/101 |
| 5,149,592 | 9/1992 | Wojnarowicz | 428/447 |
| 5,172,937 | 12/1992 | Sachetti | 283/81 |
| 5,414,258 | 5/1995 | Liang | 250/252.1 |
| 5,548,106 | 8/1996 | Liang et al. | 235/454 |
| 5,574,790 | 11/1996 | Liang et al. | 380/23 |
| 5,605,738 | 2/1997 | McGinness et al. | 428/195 |
| 5,666,417 | 9/1997 | Liang et al. | 380/23 |
| 5,869,160 | 2/1999 | Mason et al. | 428/40.2 |
| 5,885,677 | 3/1999 | Gosselin et al. | 428/40.1 |

*Primary Examiner*—Daniel Zirker
*Attorney, Agent, or Firm*—Renner, Otto, Boisselle & Sklar

[57] ABSTRACT

In one embodiment, the present invention relates to a label containing a substrate layer, and a security coating on at least one side of the substrate layer containing: from about 50% to about 99.999% by weight of a film forming material, and from about 0.001 % to about 5% by weight of at least one taggant compound, wherein the taggant compound is substantially uniformly dispersed within the film forming material. In another embodiment, the present invention relates to a method of authenticating a product, involving: affixing a label to the product, the label containing a substrate layer, and a security coating on at least one side of the substrate layer containing: from about 50% to about 99.999% by weight of a film forming material, and from about 0.001% to about 5% by weight of at least one taggant compound, wherein the taggant compound emits light of a known wavelength after irradiated with light of a first wavelength; irradiating the product with light of the first wavelength; determining whether or not the product emits light of the known wavelength; and authenticating the product if the wavelength of the light emitted by the product is substantially the same as the known wavelength.

27 Claims, No Drawings

SECURITY COATINGS FOR LABEL MATERIALS

TECHNICAL FIELD

This invention relates to coatings for label materials which can be monitored for security reasons. More particularly, the invention relates to security coatings which cannot be detected by the naked eye but can be detected by a detector.

BACKGROUND OF THE INVENTION

The sale and use of counterfeit, knock-off or imitation products are a major problem. This is because many counterfeit products are substandard in quality to an original product. As a result, real dangers, such as extreme physical harm and loss of human life, are attributable to substandard counterfeit products. For example, the use of important automobile parts such as counterfeit braking components can lead to the loss of life. This dangerous situation also exists with regard to using counterfeit jet aircraft parts or counterfeit pharmaceutical products. Any component or product made in a substandard fashion can lead to similar safety problems.

In order to prevent the sale and use of counterfeit goods, manufacturers attempt to use specially designed labels. Labels for products and product packaging are generally made of a substrate layer, an adhesive layer and sometimes a cover or protective layer. The introduction of components into label layers is not readily practiced for any number of reasons; namely, concerns over evenly distributing a given component, concerns over the manufacturability of the label materials, transparency of resultant materials, solubility concerns, and visibility concerns. In order to avoid these concerns, holograms, special fibers and/or inks are applied on a substrate for security purposes.

In this connection, an ink containing a fluorescent compound is printed in a predetermined pattern. Ink printing involves applying the ink containing the fluorescent compound on the predetermined portion of the substrate and applying a cover-protecting layer thereover. The predetermined pattern is typically in the form of a bar code or readily identifiable design. As such, the predetermined pattern is disposed on top of a substrate in a noncontinuous manner. Likewise, special fibers are also disposed on or in a substrate in a noncontinuous manner due to their physical nature.

When inks and fibers are used, a fluorescent compound is typically encapsulated, for example, in toner particles or a fiber network. Encapsulation not only results in the noncontinuous distribution of fluorescent compounds, but it also protects/shields the fluorescent compounds from the chemical environment and chemical processing of the substrate on or in which it is located. Accordingly, unauthorized alteration or reproduction of the security system is accomplished by focusing on the encapsulated material. Improved and simplified security systems are therefore desired.

SUMMARY OF THE INVENTION

In one embodiment, the present invention relates to a label containing a substrate layer, and a security coating on at least one side of the substrate layer containing: from about 50% to about 99.999% by weight of a film forming material, and from about 0.001% to about 5% by weight of at least one taggant compound, wherein the taggant compound is substantially uniformly dispersed within the film forming material.

In another embodiment, the present invention relates to a label, containing a substrate layer, and a security coating on at least one side of the substrate layer containing: at least one acrylate monomer optionally containing at least one internal flexible unit; at least one reactive vinyl or unsaturated monomer; at least one taggant compound; and optionally at least one photoinitiator.

In yet another embodiment, the present invention relates to a label, containing a substrate layer, and an adhesive security coating on at least one side of the substrate layer containing: from about 70% to about 99.999% by weight of an adhesive material; from about 0.001% to about 5% by weight of at least one taggant compound.

In still yet another embodiment, the present invention relates to a method of authenticating a product, involving: affixing a label to the product, the label containing a substrate layer, and a security coating on at least one side of the substrate layer containing: from about 50% to about 99.999% by weight of a film forming material, and from about 0.001% to about 5% by weight of at least one taggant compound, wherein the taggant compound emits light of a known wavelength after irradiated with light of a first wavelength; irradiating the product with light of the first wavelength; determining whether or not the product emits light of the known wavelength; and authenticating the product if the wavelength of the light emitted by the product is substantially the same as the known wavelength.

As a result of the present invention, product authentication and verification can be controlled with a high degree of security since the detectable taggant compound is in the label materials from the beginning of the supply chain, not simply added by a printer at the later end of the supply chain. Moreover, since the taggant compound is not detectable by the naked human eye, it is not readily apparent that a product (or packaging) with a label according to the present invention is security marked.

DETAILED DESCRIPTION OF THE INVENTION

Security coatings contain a taggant compound and a film forming material. The film forming material may be any material capable of forming a film and containing a taggant compound distributed therein in a uniform and continuous manner. Within label materials, examples of the film forming material include materials for facestock surface treatment layers or facestock coating layers or topcoat layers, adhesives for adhesive layers, materials for primer layers and materials for security layers.

The security coating is any continuous coating that may be applied to or used within a label. Examples illustrating the use of a security coating in label materials include a security coating layer on one side of a facestock having an adhesive layer on the other side of the facestock; a security coating layer on one side of a facestock and an adhesive layer on the security coating; a security coating layer on one side of a facestock having an adhesive layer on the other side of the facestock and a release coated liner over the adhesive layer; a security coating layer on one side of a facestock with an adhesive layer over the security coating layer and a release coated liner over adhesive layer; a facestock having security coating layer which acts as an adhesive layer; a facestock having security coating layer which acts as an adhesive layer and a release coated liner over the adhesive security coating layer; and a facestock having a topcoat on one side and a security coating layer on the other side which acts as an adhesive layer and a release coated liner over the adhesive security coating layer. Security coatings, when applied to a facestock, as an topcoat, adhesive, primer or other label material, can be applied as solutions, emulsions, dispersions, suspensions or 100% solid systems, by a number of methods such as roll coating, gravure coating, rod coating, and other methods known to those skilled in the art.

Invisible as used herein means light or electromagnetic radiation having a wavelength which cannot be detected by the naked human eye. Invisible light has a wavelength from above about 0 nm (or sometimes about $10^{-5}$ nm) to about 390 nm and from about 700 nm to about 30 m (or even more). Visible as used herein means light or electromagnetic radiation having a wavelength which can be detected by the naked human eye. Visible light has a wavelength between about 390 nm and about 700 nm. Ultraviolet light as used herein means light or electromagnetic radiation having a wavelength from about 5 nm to about 390 nm. Infrared light as used herein means light or electromagnetic radiation having a wavelength from about 700 nm to about 2500 nm. Invisible light includes x-ray light, ultraviolet light, deep ultraviolet light, infrared light, and microwave light.

A taggant compound is generally invisible to the naked human eye when it is incorporated into a substance; that is, the presence of a taggant compound in a substance cannot be detected by the naked human eye. The taggant compound is capable of being detected by an appropriate detecting device. In a preferred embodiment, the taggant compound is thermally stable and possesses narrow band visibility and light fastness.

In one embodiment, the security coating contains from about 0.001% to about 5% by weight of a taggant compound and from about 99.999% to about 50% by weight of a film forming material. In another embodiment, the security coating contains from about 0.01% to about 2% by weight of a taggant compound and from about 99.9% to about 75% by weight of a film forming material. In yet another embodiment, the security coating contains from about 0.05% to about 1% by weight of a taggant compound and from about 99% to about 80% by weight of a film forming material. Security coatings may contain one or more taggant compounds, such as two or more taggant compounds and three or more taggant compounds.

In one embodiment, the taggant compound is a fluorescent or phosphorescent compound. The taggant compound may be an organic taggant compound, an inorganic taggant compound or combinations thereof. Preferred taggant compounds fluoresce at specific wavelengths from about 390 nm to about 700 nm. More preferred taggant compounds fluoresce at specific wavelengths from about 425 nm to about 625 nm. For example, after irradiation with UV light, a taggant compound may fluoresce at a wavelength of 465 nm, 510 nm or 530 nm. In another embodiment, the taggant compound is a UV sensitive particle (emits light in response to UV radiation).

Inorganic taggant compounds typically include rare earth containing compounds, oxides, alkali containing compounds and alkaline earth containing compounds. Specific examples of inorganic taggant compounds include ZnS:Cu, ZnS:Cu, Au,Al, ZnS:Mn, ZnS:Ag, $ZnS:Ag+CoAl_2O_4$, BaFBr:Eu, $Y_2O_2S$:Tb, $Y_2O_2S$:Eu, $Y_2O_3$:Eu, $Y_2O_2S:Eu+Fe_2O_3$, $Zn_2SiO_4$:Mn, $Zn_2SiO_4$:Mn,As, $Gd_2O_2S$:Tb, $Gd_2O_2S$:Eu, $La_2O_2S$:Eu, $La_2O_2S$:Tb, $La_2O_2S$:Eu,Tb, $BaAl_{12}O_{19}$:Mn, $BaMgAl_{16}O_{27}$:Eu, $CaSiO_3$:Mn,Pb, $Y_2SiO_5$:Tb,Ce, $Y_3Al_5O_{12}$:Ce, $Y_3Al_{2.5}Ga_{2.5}O_{12}$:Ce, $CaSiO_3$:Mn,Pb, $YVO_4$:Nd, $YVO_4$:Eu, $Sr_5(PO_4)_3Cl$:Eu, CaS:Eu, (Ca,Sr) S:Bi, (Zn,Cd)S:Cu, (Zn,Cd)S:Ag, $(Zn,Mg)F_2$:Mn, $CaWO_4$, ZnO:Zn, $Ca_2MgSi_2O_7$:Ce, and $KMgF_2$:Mn.

Examples of organic taggant compounds include pyrazolines, oxinates, benzoxazinones, benzimidazoles, benzthiazoles, thioxanthenes, anthranilic acids, terephthalic acids, aldazines, coumarines, barbituric acids, lumiphores, oxazoles, thiazoles, cumene, stilbenes, and derivatives thereof.

Specific examples of taggant compounds include Scanning Compound #4, Scanning Compound #5, Scanning Compound #6, Scanning Compound #6S, Scanning Compound #7, Scanning Compound #25, Scanning Compound #27, and Scanning Compound #38 available from Angstrom Technologies, Inc. of Erlanger, Ky.; pentacene; yttrium oxides; europium doped yttrium oxide, yttrium vanadium oxide and lanthanum oxide; Dayglo fluorescent chemicals available from Lawter Chemicals, Inc. of Northbrook, Ill.; those under the trade designation Lumilux®, such as Green N 5, Green N2, Green N-PM, Effect Green N, Effect Green N-FF, Effect Green N-L, Effect Red N 100, Effect Red N 40, Effect Blue N, Effect Green N-FG, Effect Sipi Yellow, Effect Sipi Red, Effect Green N-F, Effect Green N-E, Effect Green A, Effect Yellow-orange A, Effect Blue A, Effect Yellow O, Effect Red A, Effect Blue OL, Effect Green-yellow O, Effect Blue-green O, Effect White-yellow O, Effect Green OL, Effect-MB Green I, Effect-MB Green, Organic CD 52300, Organic CD 52400, Organic CD 52700, Organic CD 52800, Organic CD 52900, Inorganic CD 52100, Red CD 105, Red CD 106, Red CD 110, Green CD 111, Green CD 112, Green CD 116, Green CD 117, Red CD 120, White CD 128, Yellow-orange CD 130, Yellow-orange CD 135, IR-CD 139, Green CD 140, Red CD 141, Blue CD 144, Green CD 145, Red LR 211, Green LR 212, Blue LR 213, Blue-green CD 301, White-yellow CD 304, Yellow CD 305, Green CD 306, Blue CD 307, Blue CD 312, Yellow-green CD 314, Green-blue CD 320, Green CD 321, Orange CD 322, Red CD 325, Blue-green CD 326, Green CD 333, Blue CD 334, Blue CD 336, Yellow CD 345, White CD 350, White CD 351, Yellow CD 397, White-yellow CD 404, Yellow CD 405, Green CD 421, Blue-green CD 426, White-yellow CD 704, Green CD 721, Blue-green CD 726, Yellow CD 797, Blue/Blue MF-P 821/22/6-LT, Red/Yellow MF-P 822/22/3-LT, Red MF-P 830/22/3-LT, Blue MF-P 831/22/3-LT, Yellow MF-P 833/22/3-LT, Orange MF-P 834/22/3-LT, White MF-P 836/22/3-LT, Green MF-P 837/22/3-LT, Orange MF-P 838/22/3-LT, Red MF-P 840/22/4/LT, Green MF-P 841 /22/3-LT, Red MF-P 870/LT, Red MF-P 891/6,7/6-LT, Red MF-P 892/6,7/3-LT, Dispersion Blue CD 912, Dispersion White CD 950, Dispersion Yellow CD 997, Green B 1-3, Green B 1-7, Green B 2-6, Blue F-9, Yellow B 7, Blue B 11-02, Blue B 11-3, Blue B 11-6, Blue FFL-S, Orange B 12, Green B 15, Violet B 16, Orange B 19, Yellow-green B 20-02, Yellow-green B 20-2, Yellow-green B 20-1, Yellow-green B 20-3, Yellow-green B 20-4, Yellow-green B 20-10, Green B 22-1, Red FF-F, Blue FF-F, Green FF-G, Green B 24, Red B 25, Orange B 26, Green B-AF, Orange B 33, Orange B 38-8, Orange B 38-15, Green B 101-1, Green B 39-6, Green B 39-10, Green B 43-2, Green B 43-3, Green B 43-5, Green B 43-8, Green B 44, White B 45-3, White B 45-R, White B 45, Yellow B 46-3, Yellow B 46, Yellow-green B 203-3, Yellow-green B 203, Blue B 47, Blue-white B, Yellow-green B 48, Green B 53-1, Green B 53-3, Green B 53-8, Blue B 55, Red B 56, CWR C 120, CWR C 120 R, CWR C 60 R, CWR C 180 R, CWR C 50 R-3, Blue RC-16 G, Blue RC 50, Green RGS, White RY, Green RGS-15, Red RGS, Blue RBB, Red RGS-4, Blue LZ, Yellow LZ, Natural-white Z, Green PDP-1, Green PDP-2, Red PDP-1, Blue PDP-1, Blue PDP-2, Red QYV, Red QYO, Red QG, Blue QCW, Green UC-6, Green UC-2, IR CD-LN E8719, IR CD E8721, IR CD E8725, IR CD-NL E8838, and IR CD 139, available from AlliedSignal of Morristown, N.J. and fluorescent brighteners under the trade designation Uvitex, such as Uvitex® OB, available from Ciba Geigy of Hawthorn, N.Y.

More general examples of taggant compounds under the trade designation Lumilux® include N-Pigments, Effect-Pigments, CD-Pigments, C-Pigments, B-Pigments, R-Pigments, Z-Pigments, PDP-Pigments, Q-Pigments, and IR-Pigments. In a preferred embodiment, the taggant compound is a combination of at least one compound under the trade designation Lumilux® and at least one compound from the group of Scanning Compound #4, Scanning Compound #5, Scanning Compound #6, Scanning Compound #6S, Scanning Compound #7, Scanning Compound #25, Scanning Compound #27, and Scanning Compound #38 available from Angstrom Technologies, Inc.

In a preferred embodiment, the taggant compound is represented by the Formula I:

(I)

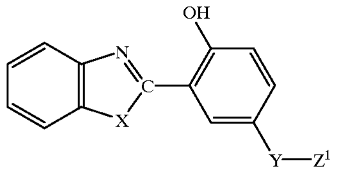

wherein X is either oxygen or sulfur, Y is NHCO or $NHCONZ^2$, and $Z^1$ is hydrogen, an aliphatic carbon group containing from 1 to about 8 carbon atoms, or a radical represented by Formula II:

(II)

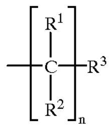

wherein $R^1$, $R^2$ and $R^3$ are independently hydrogen, an aliphatic group containing 1 to about 7 carbon atoms or an aromatic group containing 2 or less benzene rings and n is 0 to about 2.

The presence or absence of a taggant compound in a security coating is determined by a detector. Methods of detecting taggant compounds and detecting devices are known and described in U.S. Pat. Nos. 5,719,948; 5,714,291; 5,666,417; 5,605,738; 5,574,790; 5,548,106; 5,418,855; 5,414,258; 4,642,526; 4,146,792; 3,164,603; 3,162,642; and 3,066,105 which are hereby incorporated by reference to the extent they describe one or more of taggant compounds, methods of detecting taggant compounds, detectors for detecting taggant compounds, and devices and methods which facilitate detection of taggant compounds.

Detectors are capable of determining whether a certain wavelength of light is being emitted, for example, by measuring wavelengths of light present. Specific examples of detectors include Model 2000 UV Detection Scanner, Model 3000 UV Detection Scanner, Model 5000 UV Detection Scanner and Model 5500 UV Detection Scanner available from Angstrom Technologies, Inc. of Erlanger, Ky.

In one embodiment, the security coating is a facestock surface treatment layer, a facestock coating layer or a topcoat layer (collectively these layers are referred to as topcoat layers). These layers are typically positioned on one side of a substrate or facestock while an adhesive layer is positioned on the other side of the facestock. In these embodiments, the security coatings contain a taggant compound and a film forming material which may be used as a surface treatment layer, a facestock coating layer or a topcoat layer. In one embodiment, security coatings include 100% solid systems that can be cured using ultraviolet (UV) light or electron beam (EB).

In one embodiment, the security coating is a topcoat layer made of a taggant compound and radiation-curable liquids which may be epoxy prepolymers acrylated to provide terminal polymerizable acrylate groups, or acrylated polyether-polyisocyanate prepolymers or oligomers which may be dissolved in acrylate monomers which are copolymerizable therewith. Suitable monomers include trimethylolpropane triacrylate, 1 ,4-butanedioldiacrylate, neopentylglycol diacrylate, pentaerythritol tetraacrylate, 1,6-hexane-dioldiacrylate, etc.

In one embodiment, the security coating is a topcoat layer made of a taggant compound and a curable coating composition which is a mixture of: from about 30% to about 60% by weight of at least one compound selected from the group consisting of urethane acrylate acrylic oligomers, acrylated acrylic oligomers and epoxy acrylate acrylic oligomers; from 30% to 50% by weight of at least one compound selected from the group consisting of monofunctional acrylate monomers, difunctional acrylate monomers and acrylic monomers; and about 0% to 15% by weight of trifunctional acrylate monomers.

In one embodiment, the security coating is a topcoat layer made of a taggant compound and a photohardenable composition containing at least one photohardenable monomer or oligomer and at least one photoinitiator. Suitable monomers include triethylene glycol dimethacrylate, trimethylolpropane triacrylate, ethoxylated pentaerythritoltriacrylate, propoxylated neopentyl glycol diacrylate and methacrylate, and mixtures thereof.

In one embodiment, the security coating is a topcoat layer made of a taggant compound and a radiation-curable composition containing N-vinyl formamide and an oligomer which includes epoxy-acrylate resins, polyester-acrylate resins, polyurethane-acrylate resins, acrylic acrylate resins, vinyl-ether resins, etc.

In one embodiment, the security coating is a topcoat layer made of a taggant compound and a UV curable coating composition which includes an acrylated aliphatic urethane in combination with a methacrylic functionalized colloidal silica and acrylic ester monomer.

In one embodiment, the security coating is a topcoat layer made of a taggant compound and a coating containing a radiation-cured acrylic composition comprising, prior to curing (i) an acrylated or methacrylated organic polyamino compound, and (ii) an acrylated or methacrylated organic polyhydroxy compound, or a coating comprising a polyolefin film.

In one embodiment, the security coating of the present invention is a topcoat layer containing a taggant compound and at least one acrylate monomer. The acrylate monomer may or may not contain at least one internal flexible unit. Throughout the specification and claims, the terms "acrylic" and "acrylate" are used generally to include derivatives of acrylic acids as well as substituted acrylic acids such as methacrylic acid, ethacrylic acid, etc., unless clearly indicated otherwise. The term internal flexible unit is intended to include units where the atoms contained in the unit can generally rotate around the bonds joining the atoms, and such units are within a chain and not terminal. Specific examples of flexible units useful in the present invention include ether groups (or hydrocarbyleneoxy groups), particularly aliphatic ether groups, hydrocarbylene groups containing at least about 8 carbon atoms, etc. Internal ester units are not considered flexible. The ether groups can be introduced into the acrylate monomers such as by reacting a polyhydroxy compound with an aliphatic oxide such as ethylene oxide or propylene oxide or combinations of ethylene oxide and propylene oxide to form an alkoxylated polyhydroxy compound, and thereafter reacting the alkoxylated polyhydroxy compound with an acrylic acid or acrylic ester. Polyhydroxy compounds containing ether groups also can be obtained by condensing (or dimerizing, trimerizing, etc.) polyhydroxy compounds such as ethylene glycol, propylene glycol, etc., to form derivatives such as diethylene glycol, triethylene glycol, tetraethylene glycol, polyethylene glycol, propylene glycol, dipropylene glycol, tripropylene glycol, tetrapropylene glycol, polypropylene glycol, etc., and thereafter reacting the ether containing polyhydroxy compound with an acrylic acid or acrylic ester.

In some embodiments, the presence of the internal flexible unit in the acrylate monomers utilized in the security coating of the present invention may increase adhesion of the security coating to substrates such as a facestock. These monomers may be generally characterized as exhibiting fast cure and high cross-linking density. The use of acrylate monomers optionally containing internal flexible units results in a three-dimensional network with flexibility between cross-links such that adhesion to substrates such as a facestock is enhanced.

In one embodiment, the acrylate monomer optionally containing at least one internal flexible unit may be characterized by Formula III:

$$R\text{—}(OC(O)C(X)\text{=}CH_2)_m \qquad \text{(III)}$$

wherein R is a hydrocarbyl group containing from about 4 to about 20 carbon atoms and/or one or more flexible units; X is hydrogen or an alkyl group containing from 1 to 8 carbon atoms; and n is at least 2. In preferred embodiments, the flexible units are ether groups, X is hydrogen or methyl and m is 2, 3 or 4. The hydrocarbyl group R may be an aliphatic group or an aromatic group, but is preferably an aliphatic group.

The acrylate monomers optionally containing internal flexible units which are useful in the present invention, including those represented by Formula III, may be prepared by procedures well known to those skilled in the art. One method of preparing such monomers involves condensing a polyhydroxy compound to form one or more ether or alkyleneoxy linkages or reacting a polyhydroxy compound with an alkaline oxide such as ethylene oxide or propylene oxide to form ether (or alkyleneoxy) linkages and thereafter reacting the intermediate ether and hydroxy-containing compound with sufficient acrylic acid or acrylic ester or derivatives thereof to form the desired acrylate. For example, a useful acrylate monomer can be prepared by condensing or dimerizing ethylene glycol to form diethylene glycol and thereafter reacting the diethylene glycol with at least two moles of an acrylic acid or acrylic ester per mole of diethylene glycol.

Specific examples of suitable acrylate monomers optionally containing at least one internal flexible unit include the following compounds. In the following examples, as well as elsewhere in the specification and claims, unless specifically indicated otherwise, the term "acrylate" is intended to include substituted as well as unsubstituted acrylates. In particular, the term "acrylate" is intended to include alkyl acrylates containing from 1 to about 8 carbon atoms and more particularly the corresponding methacrylate derivatives.

diethylene glycol diacrylate
triethylene glycol diacrylate
tetraethylene glycol diacrylate
polyethylene glycol diacrylate
dipropylene glycol diacrylate
tripropylene glycol diacrylate
tetrapropylene glycol diacrylate
polypropylene glycol diacrylate
glyceryl ethoxylate diacrylate
glyceryl propoxylate diacrylate
glyceryl ethoxylate triacrylate
glyceryl propoxylate triacrylate
trimethylolpropane ethoxylate triacrylate
trimethylolpropane propoxylate triacrylate
neopentylglycol ethoxylate diacrylate
neopentylglycol propoxylate diacrylate
monomethoxy trimethylolpropane ethoxylate diacrylate
pentaerythritol ethoxylate tetraacrylate
pentaerythritol propoxylate tetraacrylate
dipentaerythritol ethoxylate pentaacrylate
dipentaerythritol propoxylate pentaacrylate
di-trimethylolpropane ethoxylate tetraacrylate
Bisphenol A ethoxylate diacrylate
Bisphenol A propoxylate diacrylate Examples of acrylate monomers optionally containing at least one internal flexible unit which is a hydrocarbylene group include 1,8-octanediol diacrylate, 1,10-decanediol diacrylate, polybutadiene diacrylate, etc.

In one embodiment, the topcoat security coatings of the present invention. contain from about 70% to about 99% by weight of the acrylate monomers optionally containing at least one internal flexible unit. In other embodiments, the topcoat security coatings contain at least about 75% or at least about 80% by weight of an acrylate monomer optionally containing internal flexible units. The molecular weight of the acrylate monomers may range from about 300 to about 15,000, preferably from about 400 to about 5,000; and more preferably from about 500 to about 3,000. The molecular weight may be a calculated molecular weight or an Mn determined by end group analysis.

The acrylate based topcoat security coatings of the present invention may also optionally contain at least one other reactive vinyl or unsaturated monomer wherein the reactive vinyl monomer is the same or is not the same as the acrylate monomer described above. The amount of vinyl or unsaturated monomers included in the security coating of the invention may range from about 1% to about 30% and is more often from about 1% to about 20% or about 25% by weight. The reactive vinyl or unsaturated monomers useful in this invention include vinyl ethers, mono- and polyfunctional acrylate monomers or oligomers, vinyl esters, vinyl carboxylic acids, vinyl carboxylic acid salts, vinyl amides, and unsaturated dicarboxylic acids and derivatives thereof such as maleic and fumaric acids and derivatives thereof. In one preferred embodiment, the reactive vinyl monomer is selected from the group consisting of vinyl ethers and mono- or polyfunctional acrylate oligomers, and the oligomers may or may not contain internal flexible units. In some instances, oligomers containing flexible units are preferred since they provide additional three-dimensional networks with flexibility between cross-links on curing. In one presently preferred embodiment, the reactive material included in the security coating of the invention is a mono- or polyfunctional acrylate oligomer or a mixture of such oligomers and at least one vinyl ether. In another preferred embodiment, the reactive material is at least one vinyl ether free of any mono- or polyfunctional acrylate oligomers.

Various vinyl ethers can be included in the security coating of the present invention, and these include ethers containing one or more vinyl groups. The vinyl ethers copolymerize with the acrylates and contribute by providing additional low viscosity properties to the mixtures and flexibility to the security coating. Specific examples of useful vinyl ethers include ethyl vinyl ether, butyl vinyl ether, hydroxy butyl vinyl ether, cyclohexyl vinyl ether, 2-ethylhexyl vinyl ether, octyl vinyl ether, decyl vinyl ether, dodecyl vinyl ether (Rapi-Cure DDVE), octadecyl vinyl ether, cyclohexane dimethanol monovinyl ether, phenyl vinyl ether, 1 ,6-hexanediol divinyl ether, 1,4-cyclohexane dimethanol divinyl ether (Rapi-Cure CHVE), diethylene glycol divinyl ether, triethylene glycol divinyl ether (Rapi-Cure DVE-3), tetraethylene glycol divinyl ether, dipropylene glycol divinyl ether, tripropylene glycol divinyl ether, tetrapropylene glycol divinyl ether, and the propenyl ether of propylene carbonate (Rapi-Cure PEPC). Ethers with more than one vinyl group such as 1-hexanediol divinyl ether, 1,4-cyclohexane dimethanol divinyl ether, diethylene glycol divinyl ether, triethylene glycol divinyl ether, tetraethylene glycol divinyl ether, dipropylene glycol divinyl ether, tripropylene glycol divinyl ether and tetrapropylene glycol divinyl ether are preferred. Diethylene glycol divinyl ether, triethylene glycol divinyl ether, dipropylene glycol divinyl ether and tripropylene glycol divinyl ether are most preferred. The Rapi-Cure vinyl ethers are available commercially from International Specialty Products, Wayne, N.J.

Examples of suitable polyfunctional acrylate oligomers useful in the security coatings of the invention include the following types of acrylates:

- aliphatic polyether urethane acrylates, diacrylates and polyacrylates;
- aliphatic polyester urethane acrylates, diacrylates and polyacrylates;
- aromatic polyether urethane acrylates, diacrylates and polyacrylates;
- aromatic polyester urethane acrylates, diacrylates and polyacrylates;
- polyester acrylates, diacrylates and polyacrylates;
- polyether acrylates, diacrylates and polyacrylates;
- epoxy acrylates, diacrylates and polyacrylates;
- polyamine acrylates, diacrylates and polyacrylates; and
- acrylated acrylic oligomers.

Acrylates are generally preferred over methacrylates because of higher cure speed.

Preferred acrylated oligomers are those containing internal flexible units such as aliphatic polyether urethane acrylates, diacrylates and polyacrylates; aliphatic polyester urethane acrylates, diacrylates and polyacrylates; aromatic polyether urethane acrylates, diacrylates and polyacrylates; aromatic polyester urethane acrylates, diacrylates and polyacrylates; and polyether acrylates, diacrylates and polyacrylates. Most preferred oligomers are aliphatic polyether urethane acrylates, diacrylates and polyacrylates; aliphatic polyester urethane acrylates, diacrylates and polyacrylates; and aliphatic polyether acrylates, diacrylates and polyacrylates.

Polyfunctional acrylate oligomers are available commercially from a variety of sources. Urethane acrylate oligomers are available from Morton Thiokol under the designations Uvithane 782 and Uvithane 783, and from Polymer Systems Corp., Orlando, Fla. under the designation PURELAST. Ebecryl 270 is an acrylated aliphatic urethane oligomer available from UCB Radcure, Atlanta, Ga. Epoxy acrylate oligomers are available, for example, from UCB Radcure, Atlanta, Ga. under the designations Novacure® 3600 and from Shell Chemical Company under the designation Epocryl 25A60. Although Epocryl 25A60 contains some volatile solvent, the product can be mixed with an acrylate monomer such as, for example, 1,6-hexanediol diacrylate, and the solvent originally present can be removed. An example of a commercially available acrylic acrylate oligomer is Novacure 6700 from UCB Radcure. An example of a commercially available polyamine acrylate oligomer is Novacure 7100 from UCB Radcure. This acrylate functional oligomeric amine is a liquid having a viscosity in the range of 500 to 1500 CPS at 25° C. and a theoretical molecular weight of 800, and the oligomer contains less than 10% of hexanediol diacrylate.

As noted above, the reactive material utilized in the topcoat security coating of the present invention also may be at least one mono- or polyfunctional acrylate monomer wherein the polyfunctional acrylate monomer is the same or different from the acrylate monomer optionally containing at least one internal flexible unit. However, the reactive material also may optionally contain at least one internal flexible unit. Specific examples of mono- and polyfunctional acrylate monomers which can be utilized as a reactive material in the security coating of the present invention include one or more of the following: ethylhexyl acrylate; 2-ethoxyethyl acrylate; cyclohexyl acrylate; lauryl acrylate; stearyl acrylate; alkoxylated phenol acrylates; alkoxylated nonylphenol acrylates; nonylphenol acrylate; isobornyl acrylate; acrylated epoxy soya oil; acrylated epoxy linseed oil; caprolactone acrylate; 2-phenoxyethyl acrylate; benzyl acrylate; monomethoxy tripropylene glycol monoacrylate; monomethoxy neopentyl glycol propoxylate monoacrylate; 1 ,3-butanediol diacrylate; 1,4-butanediol diacrylate; 1,6-hexanediol diacrylate; trimethylolpropane triacrylate; glyceryl triacrylate; pentaerythritol triacrylate; pentaerythritol tetraacrylate; dipentaerythritol pentaacrylate; ditrimethylolpropane tetraacrylate; tris(2-hydroxyethyl)isocyanurate triacrylate, tetrahydrofurfuryl acrylate; isooctyl acrylate; isodecyl acrylate; 2-(2-ethoxyethoxy) ethyl acrylate; ethylene glycol diacrylate; propylene glycol diacrylate; neopentyl glycol diacrylate; cyclopentenyl oxyethyl acrylate; 9-anthracenyl methyl acrylate; 1-pyrenylmethyl acrylate; Fluorescein diacrylate; and 3,8-diacryloyl ethidium bromide.

Acrylate monomers are generally preferred over methacrylate monomers because of higher cure speed. Difunctional and polyfunctional acrylate monomers are preferred for higher cure speed. Generally, the acrylate monomers with higher molecular weights are preferred due to lower volatility and lower odor. As the molecular weight is increased, however, there is generally an increase in viscosity so that the upper limit of molecular weight for monomers and oligomers may be determined based on viscosity considerations. A low overall viscosity generally is desired for fast wetout and coating at high speeds. The monomers and oligomers useful as reactive materials in the security coatings have calculated molecular weights from about 150 to about 15,000, preferably about 300 to about 5,000 or 10,000, and more preferably from about 300 to about 3,000. The molecular weight is either a calculated molecular weight based on the sum of the atomic weights of the atoms making up the monomer or oligomer, or the molecular weight is a number average molecular weight (Mn) which may be determined by end group analysis.

Examples of vinyl esters include vinyl propionate, vinyl acetate, vinyl 2-ethyl hexanoate, etc.

In one specific embodiment, the topcoat security coating is a radiation-curable coating composition containing from about 70% to about 99% by weight of at least one acrylate monomer containing at least one internal flexible unit; from about 1% to about 30% by weight of at least one other reactive vinyl or unsaturated monomer, provided the vinyl or unsaturated monomer is not the same as the acrylate monomer; from about 0% to about 10% by weight of at least one photoinitiator; and from about 0.001% to about 5% by weight of at least one taggant compound, optionally further provided that the composition is free of methacrylic functionalized colloidal silica. In another embodiment, the coating compositions are free of N-vinyl formamide.

In another specific embodiment, the topcoat security coating of the present invention contains: from about 70% to about 99% by weight of a first mixture comprising (1) at least one diacrylate monomer obtained by reacting two moles of acrylic acid or methacrylic acid with one mole of an ethoxylated or propoxylated aliphatic diol, and (2) at least one triacrylate obtained by reacting three moles of acrylic acid or methacrylic acid with one mole of an ethoxylated or propoxylated aliphatic triol; from about 1% to about 30% by weight of at least one mono- or polyfunctional acrylate oligomer which may optionally contain internal flexible units such as ethoxy and propoxy groups; from 0% to about 10% by weight of at least one photoinitiator; and from about 0.001% to about 5% by weight of at least one taggant compound. The weight ratio of diacrylate monomer to triacrylate monomer contained in the first mixture may range from about 1 to 9 to about 9 to 1. Preferably the security coating contains from about 75% or even 80% up to 99% by weight of the first mixture, from about 1 to about 20 or 25% of mono- or polyfunctional acrylate oligomer, from 0% to about 5% of photoinitiator, and from about 0.01% to about 2% by weight of a taggant compound.

Specific examples of first mixtures containing at least one diacrylate monomer and at least one triacrylate monomer include:

- glyceryl propoxylate diacrylate and glyceryl ethoxylate triacrylate;
- glyceryl ethoxylate diacrylate and glyceryl ethoxylate triacrylate;
- neopentyl glycol propoxylate diacrylate and trimethylolpropane propoxylate triacrylate; etc.

In yet another specific embodiment, the above topcoat security coating which comprises a first mixture of a diacrylate monomer and a triacrylate monomer, at least one mono- or polyfunctional acrylate oligomer, a photoinitiator, and a taggant compound, may also contain at least one vinyl ether. Any of the vinyl ethers described above can be utilized in this combination. The vinyl ethers copolymerize with the acrylates, and their use serves to further improve the flexibility and low viscosity properties of the security coatings of the invention. The amount of vinyl ether included in the security coatings may range from about 1% to about 10% by weight.

In one embodiment, the topcoat security coatings of the present invention are radiation-curable, and thus, the security coating may contain from 0% to about 10%, more often from 0% to about 5% by weight of at least one photoinitiator. A photoinitiator is not required when the security coating can be cured by electron beam (EB) processes. A photoinitiator is necessary when the security coating can be cured by ultraviolet (UV) light. Photoinitiators are classified in two major groups based upon a mode of action. Cleavage-type photoinitiators include acetophenones, benzoin ethers, benzoyl oximes and acyl phosphines. Abstraction-type photoinitiators include benzophenone, Michier's ketone, thioxanthones, anthraquinone, camphorquinone and ketocoumarin. Abstraction-type photoinitiators function better in the presence of materials such as amines and other hydrogen donor materials added to provide labile hydrogen atoms for abstraction. In the absence of such added materials, photoinitiation may still occur via hydrogen abstraction from monomers, oligomers or other components of the system.

Examples of photoinitiators which may be used include one or more of the following.

- benzophenone
- benzyldimethyl ketal
- isopropylthioxanthone
- bis(2, 6-dimethoxybenzoyl)(2,4,4-trimethylpentyl)-phosphine oxide
- 2-hydroxy-2-methyl-1-phenyl-1-propanone
- diphenyl(2,4, 6-trimethybenzoyl)phosphine oxides
- 1-hydroxycyclohexyl phenyl ketone
- 2-benzyl-2-(dimethylamino)- 1-[4-(4-morpholinyl) phenyl]-1-butanone
- $\alpha,\alpha$-dimethoxy-$\alpha$-phenylacetophenone
- 2,2-diethoxyacetophenone
- 2-methyl-1-[4-(methylthio)phenyl]-2-(4-morpholinyl)-1-propanone
- 2-hydroxy-1-[4-(hydroxyethoxy)phenyl]-2-methyl-1-propanone It is generally preferably to use combinations of photoinitiators to achieve the best possible surface and through cure of security coating. Reactive photoinitiators, which contain polymerizable groups, may also be used in order to react the photoinitiator molecules into the cross-linked polymer matrix. Photoinitiators are preferably used in the least amount necessary to get initiation of cure at the line speed of the process. The cure process is generally more efficient in the absence of oxygen, for example, in the presence of nitrogen, so a greater amount of photoinitiator is generally required in the presence of oxygen.

Examples of hydrogen donor materials which may be utilized in combination with photoinitiators include, but are not limited to, one or more of the following.

- ethyl-4-dimethylaminobenzoate
- octyl-p-(dimethylamino)benzoate
- N-methyldiethanolamine
- dimethylethanolamine
- triethanolamine
- tri-n-propylamine
- diethylethanolamine
- triethylamine
- diisopropylethylamine
- diisopropylethanolamine
- dimethylaminomethylphenol
- tris(dimethylaminomethyl)phenol
- benzyldimethylamine
- amine acrylates
- amine methacrylates Any appropriate type of lamp, for example, mercury vapor, pulsed xenon, or electrodeless, may be used for UV curing. Choice of photoinitiator or photoinitiator combinations, with characteristic absorbance spectra, should be matched with the spectral output of the bulb, for example, H bulb, D bulb, Q bulb, or V bulb, for highest curing efficiency.

In one embodiment, the topcoat security coatings of the present invention generally are free or substantially free of methacrylic functionalized colloidal silica for the type described in EP Patent Application 0 505 737 A1. In another embodiment, the topcoat security coatings contain methacrylic functionalized colloidal silica so long as it is compatible with the taggant compound (does not deleteriously affect the characteristics of the taggant compound). In yet another embodiment, the topcoat security coatings of the present invention are also free or substantially free of N-vinyl formamide.

The topcoat security coatings of the present invention may be prepared by mixing the above-described components. The components may be mixed at room temperature with stirring, and mild heating may be employed in some instances to facilitate mixing. Since the components of the topcoat security coatings may undergo some separation during storage, mild agitation or mixing just prior to use is effective to redisperse the components and is recommended.

In one embodiment, the security coating is a topcoat layer made of a film forming emulsion containing a taggant compound. Although any suitable polymeric material can be employed in the film forming emulsion, the film forming polymer emulsion is typically an acrylic based polymer. Acrylic based polymers contain at least monomers of acrylates, methacrylates, alkyl acrylates and alkyl methacrylates and optionally one more of other monomers, copolymerizable compounds, and additives. Another suitable polymeric material that can be employed in the film forming polymer emulsion is a vinyl based polymer formed from any monomer having polymerizable unsaturation.

The components of the film forming emulsion polymer are combined in any suitable manner (mixed, blended, etc.) with a taggant compound to provide the security coatings according to the present invention. For example, the security coatings of this embodiment are generally formulated by first preparing an film forming polymer emulsion as described above, and adjusting its pH to between about 6 and about 7, and adding a taggant compound.

In one embodiment, the film forming emulsion contains from about 70% to about 99.999% by weight of a film forming polymer emulsion and about 0.001% to about 5% by weight of a taggant compound (the balance optional additives). In another embodiment, the film forming emulsion contains from about 80% to about 99% by weight of a film forming polymer emulsion and about 0.01% to about 3% by weight of a taggant compound (the balance optional additives).

In addition to the film forming polymer emulsion (typically comprising one or more alkyl acrylate monomers), the film forming polymer emulsion comprises up to about 2 parts of one or more polar monomers such as methacrylic acid, acrylic acid, itaconic acid, maleic acid, or acrylamide. The polar monomers impart mechanical stability to the polymer.

The film forming polymer emulsions of this embodiment may further comprise up to about one part and preferably from about 0.1 part to about 0.3 part of at least one multifunctional acrylate monomer. The multifunctional acrylate monomer may be present in an amount of at least about 0.1 percent. Examples of suitable multifunctional acrylates include polyethylene glycol diacrylate, hexane diol diacrylate, ethoxylated trimethylpropane triacrylate, pentaerythritol triacrylate and polypropylene glycol diacrylate.

An initiator induces polymerization of the monomers. Any suitable initiator may be used. Initiators include peroxides and peroxydisulfates. The initiator is preferrably present in an amount of about 0.1 percent to about 0.2 percent of the monomer weights.

A protective colloid, also known in the art as a steric stabilizer, is preferably present in the film forming emulsion in an amount of up to about 1 percent by weight of the film forming emulsion polymer and preferably from about 0.5 percent to about 1 percent by weight of the film forming polymer emulsion. Any suitable protective colloid may be used.

To obtain film forming polymer emulsions having the above parameters, it preferable that the particle size of the emulsion from which the polymers are synthesized does not exceed about 210 nm. Such a particle size tends to stabilize the polymer emulsion.

In one embodiment, preparing of acrylic-based polymer emulsions involves polymerization in the presence of a combination of anionic and non-ionic emulsifiers or surfactants. In one embodiment, the total amount of anionic and non-ionic emulsifiers is preferably maintained below about 4.0 percent by weight and more preferably below about 3.7 percent by weight based on the weight of the film forming polymer emulsion.

In addition to the anionic and non-ionic emulsifiers, the particle size is preferably controlled by the inclusion of a small amount of electrolyte such as tetrasodium pyrophosphate, ammonium phosphate di- or mono-basic or the like in the emulsion. In one embodiment, the amount of electrolyte is from about 0.15 to about 0.3 percent by weight based on the weight of the film forming polymer emulsion.

Methods for preparing the film forming polymer emulsions comprise first preparing a catalyst feed and a pre-emulsion feed. The catalyst feed comprises water and catalyst. Any suitable catalyst may be utilized. For example, sodium formaldehyde sulfoxylate may be used. The pre-emulsion comprises the monomers (typically the alkyl acrylate monomers), polar monomers, multifunctional acrylate monomers, plasticizer, initiator, anionic and non-ionic emulsifiers and water.

In the method, catalyst and pre-emulsion feeds are added simultaneously to a suitable reactor. The feed rates for the catalyst and pre-emulsion feeds are adjusted so that the monomers and catalyst are added to the reactor over a period of from about 2 to about 4 hours. After about 20% to about 60% of the pre-emulsion feed and catalyst feed have been added, the pH of the resulting emulsion is adjusted to about 6.3 to about 6.5 by the addition of sodium bicarbonate or the like. At this point, the protective colloid is mixed with the catalyst feed. The catalyst feed and the pre-emulsion feeds are again added simultaneously to the reactor along with the taggant compound at the desired rates preferably over a period of about 1 to about 2 hours whereby the feeds end simultaneously. Polymerization results in the formation of a latex having a viscosity typically in the range of from about 2500 to about 3500 centipoise.

In one embodiment, the security coating is a topcoat layer made of a film containing a polymeric material and taggant compound formed from a solvent based polymer or polymer solution. Although any suitable polymeric material can be employed in the solvent based polymer, the polymeric material is typically an acrylic based polymer. Acrylic based polymers contain at least monomers of acrylates, methacrylates, alkyl acrylates and alkyl methacrylates and optionally one more of other monomers, copolymerizable compounds, and additives, as described hereinabove. Any of the materials useful for forming polymeric materials described above can be used in making the topcoat security coatings of the present invention from solvent based polymers.

Solvent polymerization techniques for forming the solvent based polymers are known, but generally components for the film forming polymer and a suitable solvent are combined in any suitable manner (mixed, blended, etc.) with a taggant compound, heated, optionally under pressure, to provide the polymeric material in the solvent. The solvent is separated by any suitable means, for example, by distillation, decantation or filtration, to provide a security coating according to the present invention. Suitable solvents include organic solvents such as alcohols, esters, ketones, halogen containing organic solvents, and hydrocarbon solvents, such as aromatic hydrocarbon solvents and non-aromatic hydrocarbon solvents. Organic solvent and water mixtures may be used, typically with relatively polar organic solvents such as lower alcohols.

The following examples illustrate the topcoat security coatings of the present invention. Unless otherwise indicated in the following examples, in the specification and in the appended claims, all parts and percentages are by weight, temperatures are in degrees centigrade and pressures are at or near atmospheric pressure.

In the following examples, the commercial components are identified as follows:

| Tradename | Chemical | Supplier |
|---|---|---|
| Novacure ® 3600 | epoxy acrylate oligomer | UCB-Radcure |
| Ebecryl ® 270 | acrylated aliphatic urethane oligomer | UCB-Radcure |
| Ebecryl ® 8402 | aliphatic urethane diacrylate oligomer | UCB-Radcure |
| Photomer ® 4127 | neopentylglycol propoxylate diacrylate | Henkel |
| Photomer ® 4072 | trimethylolpropane propoxylate triacrylate | Henkel |
| Rapi-Cure ® CHVE | 1,4-cyclohexane dimethanol divinyl-ether | International Specialty Products (ISP) |
| Rapi-Cure ® DDVE | dodecyl vinyl ether | ISP |
| Rapi-Cure ® DVE-3 | triethylene glycol divinyl ether | ISP |
| Rapi-Cure ® PEPC | propenyl ether of propylene carbonate | ISP |
| BYK ®-080 | polysiloxane defoamer | BYK-Chemie |
| BYK ®-361 | acrylic copolymer wetting agent | BYK-Chemie |
| Darocur ® 1173 | 2-hydroxy-2-methyl-1-phenyl-1-propanone | Ciba-Geigy |
| Irgacure ® 500 | mixture of benzophenone and 1-hydroxy cyclohexyl phenyl ketone | Ciba-Geigy |
| CGI-1700 | mixture of bis(2,6-dimethoxybenzoyl) (2,4,4-trimethylpentyl)phosphine oxide and 2-hydroxy-2-methyl-1-phenyl-1-propanone | Ciba-Geigy |
| Scanning Compound #4 | proprietary | Angstrom Tech.,Inc. |
| Scanning Compound #6 | proprietary | Angstrom Tech., Inc. |
| Scanning Compound #25 | proprietary | Angstrom Tech., Inc. |
| Lumilux ® CD 704 | proprietary | AlliedSignal |
| Lumilux ® CD 740 | proprietary | AlliedSignal |

EXAMPLE 1

| | Parts/Wt. |
|---|---|
| neopentyl glycol propoxylate diacrylate | 74.5 |
| Novacure ® 3600 | 25 |
| Lumilux ® CD 740 | 0.5 |

EXAMPLE 2

| | |
|---|---|
| trimethylolpropane propoxylate triacrylate | 79.9 |
| Novacure ® 6700 | 20 |
| Lumilux ® CD 704 | 0.1 |

EXAMPLE 3

| | |
|---|---|
| dipropylene glycol diacrylate | 30 |
| glyceryl ethoxylate triacrylate | 50 |
| Novacure 3600 | 19.25 |
| Lumilux ® CD 704 | 0.75 |

EXAMPLE 4

| | |
|---|---|
| dipropylene glycol diacrylate | 30 |
| glyceryl ethoxylate triacrylate | 50 |
| Novacure 3600 | 17.5 |
| CGE-1700 | 2.25 |
| Lumilux ® CD 704 | 0.25 |

EXAMPLE 5

| | |
|---|---|
| Photomer 4127 | 35.1 |
| Photomer 4072 | 49.3 |
| Ebecryl 270 | 10.0 |
| BYK-080 | 0.35 |
| BYK-361 | 0.2 |
| Darocur 1173 | 5.0 |
| Scanning Compound #6 | 0.05 |

EXAMPLE 6

| | |
|---|---|
| Photomer 4127 | 35.0 |
| Photomer 4072 | 49.4 |
| Ebecryl 270 | 10.0 |
| BYK-080 | 0.4 |
| BYK-361 | 0.199 |
| Rapi-Cure CHVE | 5.0 |
| Darocur-1173 | 5.0 |
| Scanning Compound #4 | 0.001 |

EXAMPLE 7

| | |
|---|---|
| Photomer 4127 | 35.0 |
| Photomer 4072 | 47.4 |
| Ebecryl 270 | 10.0 |
| BYK-080 | 0.4 |
| BYK-361 | 0.2 |
| Rapi-Cure DDVE | 5.0 |
| Darocur-1173 | 5.0 |
| Pentacene | 2 |

EXAMPLE 8

| | |
|---|---|
| Photomer 4127 | 35.0 |
| Photomer 4072 | 49.4 |
| Ebecryl 270 | 9.75 |
| BYK-080 | 0.4 |
| BYK-361 | 0.2 |
| Rapi-Cure DVE-3 | 5.0 |
| Scanning Compound #6 | 0.25 |
| Darocur-1173 | 5.0 |

EXAMPLE 9

-continued

| | |
|---|---|
| Photomer 4127 | 35.0 |
| Photomer 4072 | 49.4 |
| Ebecryl 270 | 10.0 |
| BYK-080 | 0.4 |
| BYK-361 | 0.19 |
| CGI-1700 | 5.0 |
| Scanning Compound #4 | 0.01 |

EXAMPLE 10

| | |
|---|---|
| Photomer 4127 | 15.4 |
| Photomer 4072 | 64.0 |
| Ebecryl 270 | 4.98 |
| BYK-080 | 0.4 |
| BYK-361 | 0.2 |
| Rapi-Cure DVE-3 | 10.0 |
| Irgacure 500 | 3 |
| Scanning Compound #4 | 0.02 |

EXAMPLE 11

| | |
|---|---|
| Photomer 4127 | 15.4 |
| Photomer 4072 | 64.0 |
| Ebecryl 270 | 5.0 |
| BYK-080 | 0.4 |
| BYK-361 | 0.2 |
| Rapi-Cure DVE-3 | 9.995 |
| Irgacure 500 | 5.0 |
| Scanning Compound #6 | 0.005 |

EXAMPLE 12

| | |
|---|---|
| Photomer 4127 | 16.2 |
| Photomer 4072 | 65.2 |
| Ebecryl 270 | 5.0 |
| BYK-080 | 0.3 |
| BYK-361 | 0.2 |
| Rapi-Cure PEPC | 10.0 |
| Irgacure 500 | 3.0 |
| Scanning Compound #4 | 0.1 |

EXAMPLE 13

| | |
|---|---|
| Photomer 4127 | 16.4 |
| Photomer 4072 | 66.0 |
| Ebecryl 8402 | 5.0 |
| BYK-080 | 0.2 |
| BYK-361 | 0.2 |
| Rapi-Cure DVE-3 | 10.0 |
| Irgacure 500 | 2.0 |
| Scanning Compound #4 | 0.2 |

The topcoat security coatings of the present invention as described above exhibit detectable signals and adequate adhesion to substrates and especially facestocks such as polymeric films, paper substrates, metallic or metallized films, pressure-sensitive adhesive films, and paper constructions.

The topcoat security coatings of the present invention may be applied to various substrates as a coating by any conventional means known in the coating art such as by roller coating, brushing, spraying, reverse roll coating, dipping, offset gravure, etc. The topcoat security coatings of the present invention may be heated or cooled to facilitate the coating process and to alter the depth or penetration of the liquid into the substrate prior to curing.

The amount of topcoat security coating applied to one surface of a substrate such as a facestock may be varied depending upon the characteristics of the substrate, the characteristics desired to be imparted to the substrate, and the particular formulation of the film forming material of the security coating. Typically, the applied topcoat security coating weights may, depending on the substrate and intended use, range from about 0.1 to about 25 grams/$m^2$. More often, applied topcoat security coating weights are from about 0.5 to about 1.5 grams/$m^2$. The substrates which have been coated with the security coatings can be cured by exposure to heat and/or known forms of ionizing or actinic non-ionizing radiation. Useful types of radiation include visible light, ultraviolet light, electron beam, x-ray, gamma-ray, beta-ray, etc. As noted above, if visible light or ultraviolet light is to be used as the form of radiation, a photoinitiator such as those described above is included in the topcoat security coating. Photoinitiators are not required for electron beam curing. One of the advantages of using radiation to effect curing of the composition is that polymerization takes place rapidly at ambient temperature, and heating is not necessary. The equipment for generating these forms of radiation are well known to those skilled in the art. Electron beam radiation and ultraviolet light are the presently preferred forms of radiation to be used with the compositions of the present invention.

Curing of the topcoat security coating can be effected in a continuous manner by passing the security coated substrate through radiation equipment which is designed to provide the security coated substrate with sufficient residence time to completely cure the security coating. Curing may be effected at or near atmospheric pressure or in an inert atmosphere such as nitrogen or argon. An inert atmosphere is preferred. The length of exposure necessary to cure the security coating varies with such factors as the particular formulation used, the type and wavelength of radiation, dosage rate, the atmosphere, energy flux, concentration of photoinitiator (when required), and the thickness of the security coating. For electron beam curing, dosage rates of from 0.1 to about 10 megarads, generally below 4 megarads, provide a desirable security curing. For UV curing, dosage rates of generally 100–500 milli Joules provide the desired security curing. Generally, the exposure is quite brief and curing is completed in less than about 0.001 to about 0.1 seconds. The actual exposure time required to give proper curing for various security coatings can be readily determined by one skilled in the art with a minimum of experimentation. Excess curing of the security coatings generally should be avoided.

In one embodiment, the security coating of the present invention is an adhesive layer containing a taggant compound and an adhesive. In this embodiment, the film forming material is an adhesive. Generally, an adhesive layer or adhesive security coating containing a taggant compound and an adhesive is applied to one surface of a label substrate, such as a facestock.

The amount of adhesive security coating applied to the substrate surface may range from about 1 to about 100 grams/$m^2$, and more often, the amount is in the range of from about 15 to about 45 grams/$m^2$. Although any suitable adhesive may be used including hot melt and pressure-sensitive adhesives, in one preferred embodiment, the adhesive is a pressure-sensitive adhesive. Any adhesive may be used in the adhesive security coating which forms an aggressive adhesive bond to a substrate and to any other surface to which the adhesive security coated substrate is adhered.

Any hot melt or heat activated adhesive known in the art can be used in preparing the security coating of the present invention, and heat activated adhesives are commercially available, such as product number HM727 from H. B. Fuller of Blue Ash, Ohio, believed to be a blend of ethylenevinyl acetate copolymer, polyethylene waxes and a tackifier.

Any pressure-sensitive adhesive known in the art can be used in preparing the security coating of the present invention, and pressure-sensitive adhesive compositions are described in, for example, "Adhesion and Bonding," *Encyclopedia of Polymer Science and Engineering*, Vol. 1, pp. 476–546, Interscience Publishers, 2d Edition, 1985, the disclosure of which is hereby incorporated by reference. Such adhesive compositions generally contain an adhesive polymer such as natural, reclaimed or styrene butadiene rubber, tackified natural and synthetic rubbers, styrene-butadiene or styrene-isoprene block copolymers, random copolymers of ethylene and vinyl acetate, ethylene-vinyl-acrylic terpolymers, polyisobutylene, N-vinyl pyrolidone, polyurethanes, poly(vinyl ether), poly(acrylic)ester, alkyl acrylates such as ethyl acrylate, propyl acrylate, butyl acrylate, 2-ethylhexyl acrylate, isooctyl acrylate, isodecyl acrylate, alkyl methacrylates such as ethyl methacrylate, methyl methacrylate, and butyl methacrylate, etc., as a major constituent. The acrylates and methacrylates can be copolymerized with one or more of vinyl-unsaturated monomers, unsaturated carboxylic acids, acrylamide and vinyl caprolactam. Other materials may be included in the pressure-sensitive adhesive composition such as resin tackifiers including, for example, rosin esters, oil-soluble phenolics or polyterpenes; antioxidants; plasticizers such as mineral oil or liquid polyisobutylenes; and fillers such as zinc oxide or hydrated alumina. Hot melt, emulsion and solvent pressure-sensitive adhesive compositions may be used as the film form material of the security coating.

Various adhesive materials are described in U.S. Pat. Nos. 4,428,857; 4,925,714; 5,372,669; 5,520,760; 5,436,073; 5,585,193; 5,700,564; 5,716,669; and 5,720,739 which are hereby incorporated by reference to the extent they describe film forming materials, and in particular, adhesive materials and methods of making and using the same.

In one embodiment, the security coating of the present invention is a primer layer containing a taggant compound and a primer. In this embodiment, the film forming material is a primer material. Primer layers are typically positioned between the facestock and the adhesive layer. In one embodiment, the primer is a white ultraviolet-cured leveling primer. White ultraviolet curable leveling primers are available commercially such as from Avery Dennison under the designation Avery Dennison Clear Primer AC518. Equivalent materials are available from other sources.

In one embodiment, the security coating is a primer layer made of a taggant compound and radiation-curable liquids which may be epoxy prepolymers acrylated to provide terminal polymerizable acrylate groups, or acrylated polyether-polyisocyanate prepolymers or oligomers which may be dissolved in acrylate monomers which are copolymerizable therewith. Suitable monomers include trimethylolpropane triacrylate, 1,4-butanedioldiacrylate, neopentylglycol diacrylate, pentaerythritol tetraacrylate, 1,6-hexanedioldiacrylate, etc.

In one embodiment, the security coating is a primer layer made of a taggant compound and a curable coating composition which is a mixture of: from about 30% to about 60% by weight of at least one compound selected from the group consisting of urethane acrylate acrylic oligomers, acrylated acrylic oligomers and epoxy acrylate acrylic oligomers; from 30% to 50% by weight of at least one compound selected from the group consisting of monofunctional acrylate monomers, difunctional acrylate monomers and acrylic monomers; and about 0% to 15% by weight of trifunctional acrylate monomers.

In one embodiment, the security coating is a primer layer made of a taggant compound and a photohardenable composition containing at least one photohardenable monomer or oligomer and at least one photoinitiator. Suitable monomers include triethylene glycol di methacrylate, trimethylolpropane triacrylate, ethoxylated pentaerythritoltriacrylate, propoxylated neopentyl glycol diacrylate and methacrylate, and mixtures thereof.

In one embodiment, the security coating is a primer layer made of a taggant compound and a radiation-curable composition containing N-vinyl formamide and an oligomer which includes epoxy-acrylate resins, polyester-acrylate resins, polyurethane-acrylate resins, acrylic acrylate resins, vinyl-ether resins, etc.

In one embodiment, the security coating is a primer layer made of a taggant compound and a UV curable coating composition which includes an acrylated aliphatic urethane in combination with a methacrylic functionalized colloidal silica and acrylic ester monomer.

In one embodiment, the security coating is a primer layer made of a taggant compound and a coating containing a radiation-cured acrylic composition comprising, prior to curing (i) an acrylated or methacrylated organic polyamino compound, and (ii) an acrylated or methacrylated organic polyhydroxy compound, or a coating comprising a polyolefin film. In one embodiment, the primer layer security coatings include 100% solid systems that can be cured using ultraviolet (UV) light or electron beam (EB).

In one embodiment, the security coating of the present invention is a primer layer containing a taggant compound and at least one acrylate monomer. The acrylate monomer may or may not contain at least one internal flexible unit. Specific examples of flexible units useful in the present invention include ether groups (or hydrocarbyleneoxy groups), particularly aliphatic ether groups, hydrocarbylene groups containing at least about 8 carbon atoms, etc. Internal ester units are not considered flexible. The ether groups can be introduced into the acrylate monomers such as by reacting a polyhydroxy compound with an aliphatic oxide such as ethylene oxide or propylene oxide or combinations of ethylene oxide and propylene oxide to form an alkoxylated polyhydroxy compound, and thereafter reacting the alkoxylated polyhydroxy compound with an acrylic acid or acrylic ester. Polyhydroxy compounds containing ether groups also can be obtained by condensing (or dimerizing, trimerizing, etc.) polyhydroxy compounds such as ethylene glycol, propylene glycol, etc., to form derivatives such as diethylene glycol, triethylene glycol, tetraethylene glycol, polyethylene glycol, propylene glycol, dipropylene glycol, tripropylene glycol, tetrapropylene glycol, polypropylene glycol, etc., and thereafter reacting the ether containing polyhydroxy compound with an acrylic acid or acrylic ester.

In one embodiment, the acrylate monomer optionally containing at least one internal flexible unit may be characterized by Formula III:

$$R—(OC(O)C(X)=CH_2)_m \qquad \text{(III)}$$

wherein R is a hydrocarbyl group containing from about 4 to about 20 carbon atoms and/or one or more flexible units; X is hydrogen or an alkyl group containing from 1 to 8 carbon atoms; and n is at least 2. In preferred embodiments, the flexible units are ether groups, X is hydrogen or methyl and m is 2, 3 or 4. The hydrocarbyl group R may be an aliphatic group or an aromatic group, but is preferably an aliphatic group. The acrylate monomers optionally containing internal flexible units which are useful in the present invention, including those represented by Formula III, may be prepared by procedures well known to those skilled in the art. Specific examples of suitable acrylate monomers optionally containing at least one internal flexible unit include the compounds described above in connection with the topcoat layer security coatings.

In one embodiment, the primer security coatings of the present invention contain from about 70% to about 99% by weight of the acrylate monomers optionally containing at least one internal flexible unit. In other embodiments, the primer security coatings contain at least about 75% or at least about 80% by weight of an acrylate monomer optionally containing internal flexible units. The molecular weight of the acrylate monomers may range from about 300 to about 15,000, preferably from about 400 to about 5,000; and more preferably from about 500 to about 3,000. The molecular weight may be a calculated molecular weight or an Mn determined by end group analysis.

The acrylate based primer security coatings of the present invention may also optionally contain at least one other reactive vinyl or unsaturated monomer wherein the reactive vinyl monomer is the same or is not the same as the acrylate monomer described above. The amount of vinyl or unsaturated monomers included in the security coating of the invention may range from about 1% to about 30% and is more often from about 1% to about 20% or about 25% by weight. The reactive vinyl or unsaturated monomers useful in this invention include the compounds described above in connection with the topcoat layer security coatings.

In one specific embodiment, the primer security coating is a radiation-curable coating composition containing from about 70% to about 99% by weight of at least one acrylate monomer containing at least one internal flexible unit; from about 1% to about 30% by weight of at least one other reactive vinyl or unsaturated monomer, provided the vinyl or unsaturated monomer is not the same as the acrylate monomer; from about 0% to about 10% by weight of at least one photoinitiator; and from about 0.001% to about 5% by weight of at least one taggant compound,- optionally further provided that the composition is free of methacrylic functionalized colloidal silica. In another embodiment, the coating compositions are free of N-vinyl formamide.

In another specific embodiment, the primer security coating of the present invention contains: from about 70% to about 99% by weight of a first mixture comprising (1) at least one diacrylate monomer obtained by reacting two moles of acrylic acid or methacrylic acid with one mole of an ethoxylated or propoxylated aliphatic diol, and (2) at least one triacrylate obtained by reacting three moles of acrylic acid or methacrylic acid with one mole of an ethoxylated or propoxylated aliphatic triol; from about 1% to about 30% by weight of at least one mono- or polyfunctional acrylate oligomer which may optionally contain internal flexible units such as ethoxy and propoxy groups; from 0% to about 10% by weight of at least one photoinitiator; and from about 0.001% to about 5% by weight of at least one taggant compound. The weight ratio of diacrylate monomer to triacrylate monomer contained in the first mixture may range from about 1 to 9 to about 9 to 1. Preferably the security coating contains from about 75% or even 80% up to 99% by weight of the first mixture, from about 1 to about 20 or 25% of mono- or polyfunctional acrylate oligomer, from 0% to about 5% of photoinitiator, and from about 0.01% to about 2% by weight of a taggant compound.

Specific examples of first mixtures containing at least one diacrylate monomer and at least one triacrylate monomer include: glyceryl propoxylate diacrylate and glyceryl ethoxylate triacrylate; glyceryl ethoxylate diacrylate and glyceryl ethoxylate triacrylate; neopentyl glycol propoxylate diacrylate and trimethylolpropane propoxylate triacrylate; etc.

In yet another specific embodiment, the above primer security coating which comprises a first mixture of a diacrylate monomer and a triacrylate monomer, at least one mono- or polyfunctional acrylate oligomer, a photoinitiator, and a taggant compound, may also contain at least one vinyl ether. Any of the vinyl ethers described above can be utilized in this combination. The vinyl ethers copolymerize with the acrylates, and their use serves to further improve the flexibility and low viscosity properties of the security coatings of the invention. The amount of vinyl ether included in the security coatings may range from about 1% to about 10% by weight.

In one embodiment, the primer security coatings of the present invention are radiation-curable, and thus, the security coating may contain from 0% to about 10%, more often from 0% to about 5% by weight of at least one photoinitiator. A photoinitiator is not required when the security coating can be cured by electron beam (EB) processes. A photoinitiator is necessary when the security coating can be cured by ultraviolet (UV) light. Photoinitiators are classified in two major groups based upon a mode of action. Cleavage-type photoinitiators include acetophenones, benzoin ethers, benzoyl oximes and acyl phosphines. Abstraction-type photoinitiators include benzophenone, Michler's ketone, thioxanthones, anthraquinone, camphorquinone and ketocoumarin. In the absence of such added materials, photoinitiation may still occur via hydrogen abstraction from monomers, oligomers or other components of the system.

Examples of photoinitiators which may be used include the compounds described above in connection with the primer layer security coatings. Examples of hydrogen donor materials which may be utilized in combination with photoinitiators also include the compounds described above in connection with the primer layer security coatings.

Any appropriate type of lamp, for example, mercury vapor, pulsed xenon, or electrodeless, may be used for UV curing. Choice of photoinitiator or photoinitiator combinations, with characteristic absorbance spectra, should be matched with the spectral output of the bulb, for example, H bulb, D bulb, Q bulb, or V bulb, for highest curing efficiency.

In one embodiment, the primer security coatings of the present invention generally are free or substantially free of methacrylic functionalized colloidal silica for the type described in EP Patent Application 0 505 737 A1. In another embodiment, the primer security coatings contain methacrylic functionalized colloidal silica so long as it is compatible with the taggant compound (does not deleteriously affect the characteristics of the taggant compound). In yet another embodiment, the primer security coatings of the present invention are also free or substantially free of N-vinyl formamide.

The primer security coatings of the present invention may be prepared by mixing the above-described components. The components may be mixed at room temperature with stirring, and mild heating may be employed in some instances to facilitate mixing. Since the components of the topcoat security coatings may undergo some separation during storage, mild agitation or mixing just prior to use is effective to redisperse the components and is recommended.

In one embodiment, the security coating is a primer layer made of a film forming emulsion containing a taggant compound. Although any suitable polymeric material can be employed in the film forming emulsion, the film forming polymer emulsion is typically an acrylic based polymer. Acrylic based polymers contain at least monomers of acrylates, methacrylates, alkyl acrylates and alkyl methacrylates and optionally one more of other monomers, copolymerizable compounds, and additives. Another suitable polymeric material that can be employed in the film forming polymer emulsion is a vinyl based polymer formed from any monomer having polymerizable unsaturation.

The components of the film forming polymer emulsion are combined in any suitable manner (mixed, blended, etc.) with a taggant compound to provide the security coatings according to the present invention. For example, the security coatings of this embodiment are generally formulated by first preparing an film forming polymer emulsion as described above, and adjusting its pH to between about 6 and about 7, and adding a taggant compound.

In one embodiment, the film forming emulsion contains from about 70% to about 99.999% by weight of a film forming polymer emulsion and about 0.001% to about 5% by weight of a taggant compound (the balance optional additives). In another embodiment, the film forming emulsion contains from about 80% to about 99% by weight of a film forming polymer emulsion and about 0.01% to about 3% by weight of a taggant compound (the balance optional additives).

In one embodiment, the security coating is a primer layer made of a film containing a polymeric material and taggant compound formed from a solvent based polymer or polymer solution. Although any suitable polymeric material can be employed in the solvent based polymer, the polymeric material is typically an acrylic based polymer. Acrylic based polymers contain at least monomers of acrylates, methacrylates, alkyl acrylates and alkyl methacrylates and optionally one more of other monomers, copolymerizable compounds, and additives, as described hereinabove. Any of the materials useful for forming polymeric materials described above can be used in making the topcoat or primer security coatings of the present invention from solvent based polymers.

Solvent polymerization techniques for forming the solvent based polymers are known, but generally components for the film forming polymer and a suitable solvent are combined in any suitable manner (mixed, blended, etc.) with a taggant compound, heated, optionally under pressure, to provide the polymeric material in the solvent. The solvent is separated by any suitable means, for example, by distillation, decantation or filtration, to provide a security coating according to the present invention. Suitable solvents include organic solvents such as alcohols, esters, ketones, halogen containing organic solvents, and hydrocarbon solvents, such as aromatic hydrocarbon solvents and non-aromatic hydrocarbon solvents. Organic solvent and water mixtures may be used, typically with relatively polar organic solvents such as lower alcohols.

In one embodiment, the security coating of the present invention is a security coating layer containing a taggant compound and a polymeric material. In this embodiment, the film forming material is a polymeric material capable of forming a film. Generally, it is preferred that the polymeric material used to form the security coating layer is selected to produce a clear layer. For example, an ultraviolet curable varnish available from Avery Dennison as number 519 Fasson base material can be utilized in this layer. A security coating can be positioned at any location within the label materials.

In addition to the above-described components, the various security coatings of the present invention may include other additives known to those skilled in the art. These additives may include, but are not limited to, pigments, fillers, fluorescent additives, flow and leveling additives, wetting agents, surfactants, antifoaming agents, rheology modifiers, stabilizers, and antioxidants. Preferred additives are those which do not have appreciable absorption or emission in the wavelengths of interest.

Examples of pigments and filler materials include, but are not limited to, titanium dioxide, hydrophilic silica, hydrophobic amorphous fumed silica, amorphous precipitated silica, carbon black, and polymer powders. Examples of flow and leveling additives, wetting agents, and antifoaming agents include silicones, modified silicones, silicone acrylates, hydrocarbons, fluorine-containing compounds, and non-silicone polymers and copolymers such as copolyacrylates.

Examples of stabilizers include, but are not limited to:

tetrakis[methylene(3,5-di-tert-butyl-4-hydroxyhydrocinnamate)]methane;

thiodiethylene bis(3,5-di-tert-butyl-4-hydroxyhydrocinnamate);

octadecyl 3,5-di-tert-butyl-4-hydroxyhydro-cinnamate;

bis(1,2,2,6,6-pentamethyl-4-piperidinyl)sebacate;

methyl (1,2,2,6,6-pentamethyl-4-piperidinyl)sebacate; and decanedioic acid, bis(2,2,6,6-tetramethyl-4-piperidinyl) ester, reaction products with 1,1-dimethylethylhydroperoxide and octane.

The security coatings of the present invention may be prepared by mixing the above-described components. The components may be mixed at room temperature with stirring, and mild heating may be employed in some instances to facilitate mixing. Since the components of the security coatings may undergo some separation during storage, mild agitation or mixing just prior to use is effective to redisperse the components and is recommended.

The label materials containing a topcoat security coating can be prepared by coating one surface of the substrate or facestock with a topcoat security coating of the present invention by the procedures and in the amounts described above. After application of the topcoat security coating to the substrate or facestock, the topcoat security coating is cured by heat and/or radiation, if appropriate.

The facestock may be made of one or more layers of facestock material. Facestock materials are known in the art. In one embodiment, the substrate is a paper or thermoplastic polymeric film. Examples of facestock materials include paper, polyolefins such as polyethylene, polypropylene, polybutylene, etc., copolymers and combinations thereof such as a copolymer of polyethylene and polypropylene, blends of polyethylene and polypropylene, and high density, medium density, low density and very low density forms thereof; polycarbonate; polystyrenes; polyesters such as polyethylene terephthalate and polybutylene terephthalate; vinyl containing polymers such as polyvinyl acetate, polyvinyl alcohol, ethylene vinyl acetate, polyvinyl fluoride and polyvinyl chloride; and copolymers and combinations of any of the above.

Various facestock materials are described in U.S. Pat. Nos. 4,925,714; 4,946,532; 5,143,570; 5,186,782; 5,451,283; 5,516,393; 5,585,193; 5,612,107; and 5,700,564 which are hereby incorporated by reference to the extent they describe substrates or facestock materials and methods of making and using the same.

Release coated liners are known in the art. Various release coated liners are described in U.S. Pat. Nos. 4,888,075; 4,946,532; 5,372,669; 5,436,073; 5,494,945; 5,510,190; 5,543,231; 5,612,107; 5,616,629; and 5,654,093 which are hereby incorporated by reference to the extent they describe release coated liners and methods of making and using the same.

The label materials of the present invention may be prepared in various forms including webs which may be in roll form and which can thereafter be cut or slit into strips or sheets of desired dimensions. The order in which the security coating and/or the adhesive coating (when the security coating is not an adhesive layer) are applied to the facestock or substrate is not critical. In one embodiment, the security coating is applied to one surface of the facestock or substrate, and an adhesive is thereafter applied to the other surface of the facestock or substrate or over the security coating followed by curing of the security coating, if appropriate. In another embodiment, the security coating is applied to one surface of the facestock or substrate and cured. Thereafter, an adhesive is applied to the other surface of the facestock or substrate, if the security coating is not an adhesive layer. The adhesive may be applied to the facestock or substrate soon after the security coating has been cured, or the adhesive can be applied at a much later time such as just prior to use. In another embodiment, the security coating can be put on the facestock or substrate after the adhesive. When the security coating is an adhesive security coating it may be applied to the facestock before or after a topcoat and/or a primer layer are applied.

The following examples illustrate the label materials containing security coatings according to the present invention.

Example A (A) substrate: polyethylene (B) radiation-cured coating: Example 10

Example B (A) substrate: biaxially oriented polypropylene film (B) radiation-cured coating: Example 13

Example C (A) substrate: polyethylene film (B) radiation-cured coating: Example 13

(C) adhesive: pressure-sensitive adhesive

Example D (A) substrate: biaxially oriented polypropylene film (B) radiation-cured coating: Example 13

(C) adhesive: pressure-sensitive adhesive

Example E (A) substrate: polyethylene film (B) adhesive: pressure-sensitive adhesive containing 99.5% by weight of a poly(acrylic)ester based adhesive and 0.5% by weight of Scanning Compound #4

Example F (A) substrate: biaxially oriented polypropylene film (B) adhesive: pressure-sensitive adhesive containing 99.7% by weight of a styrene-butadiene block copolymer based adhesive and 0.3% by weight of Scanning Compound #6

Example G (A) substrate: polyethylene film containing 0.1% by weight of Scanning Compound #6

(B) adhesive: pressure-sensitive adhesive

Example H (A) substrate: biaxially oriented polypropylene film containing 0.01% by weight of Scanning Compound #4

(B) adhesive: pressure-sensitive adhesive

The security features of the label materials containing a security coating according to the present invention are characterized as being undetectable to the human eye, yet detectable to an appropriate detecting device. The security coatings of the invention are particularly well-suited for providing identifying characteristics to materials thereby enabling the confirmation of authenticity.

The label materials containing a security coating according to the present invention are used with products to enable authentication and/or discrimination between different taggant compounds. Products include plastic, paper and glass containers for pharmaceutical products, automotive products and components, aircraft products and components, marine products and components, machine products and components, electronic products and components, food products, telecommunication products and components, chemical products and components, consumer goods and components, jewelry, and any other valuable article or packaging to which a label material can be affixed.

Once label materials are affixed to a product, authentication (detection of whether or not a specific taggant compound is present) is performed using one or more detecting devices. Examples of such devices and methods are listed above in connection with the description of taggant compounds. Generally speaking, detecting devices work by irradiating the subject label with light, typically from one spectral region such as the UV region, and detecting emitted light, typically from another spectral region such as the visible region. The detector is capable of measuring the wavelengths of light which are emitted by a given object (subject label).

The irradiation of the taggant compound excites the taggant compound and thereby causes the taggant compound, if present, to emit certain wavelengths of light. Different taggant compounds emit different wavelengths of light. Authentication occurs when the detecting device indicates that the wavelength of emitted light detected from the subject label, if any, corresponds to the wavelength of light that a specific taggant compound is known to emit after excitation.

While the invention has been explained in relation to its preferred embodiments and components, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A security label adherable to a product, comprising:

a substrate layer having an upper and a lower surface, and a security coating in contact with at least one of the upper and lower surfaces of the substrate layer, said security coating comprising:

from about 50% to about 99.999% by weight of a film forming material, and from about 0.001% to about 5% by weight of at least one taggant compound, wherein the taggant compound is substantially uniformly dispersed within the film forming material, and wherein said taggant compound fluoresces at a known wavelength within the range of 390 nm to 700 nm upon irradiation with ultraviolet light of said label and wherein said taggant is detectable without removing the label from the product.

2. The label of claim 1, wherein the security coating is an adhesive layer in contact with the lower surface of said substrate layer.

3. The label of claim 1, wherein the security coating is a topcoat layer in contact with the upper surface of said substrate layer.

4. The label of claim 1, wherein the label further comprises an adhesive layer, and the security coating is positioned between the substrate layer and the adhesive layer.

5. The label of claim 1, wherein the security coating is a primer layer in contact with the lower surface of said substrate layer.

6. The label of claim 1, wherein the film forming material comprises a radiation curable polymer.

7. The label of claim 1, wherein the security coating is made from about 75% to about 99.9% by weight of an acrylate monomer.

8. The label of claim 1, wherein the film forming material comprises a pressure sensitive adhesive.

9. The label of claim 1, wherein the film forming material comprises a heat activated adhesive.

10. The label of claim 1, wherein the security coating is formed from a 100% solids system or a polymer emulsion.

11. The label of claim 1, wherein the security coating is formed from a solvent based polymer.

12. A security label adherable to a product, comprising:

a substrate layer having an upper and a lower surface, and a security coating in contact with at least one of the upper and lower surfaces of the substrate layer, said security coating comprising:

at least one acrylate monomer optionally containing at least one internal flexible unit;

at least one reactive vinyl or unsaturated monomer;

at least one taggant compound wherein said taggant compound fluoresces at a known wavelength within the range of 390 nm to 700 nm upon irradiation with ultraviolet light of said layer and wherein said taggant is detectable without removing the label from the product; and optionally at least one photoinitiator.

13. The label of claim 12, wherein the security coating comprises from about 70% to about 99% by weight of at least one acrylate monomer optionally containing at least one internal flexible unit; from about 1% to about 30% by weight of at least one reactive vinyl or unsaturated monomer; from about 0.001% to about 5% by weight of at least one taggant compound; and from about 0% to about 10% by weight of at least one photoinitiator.

14. The label of claim 12, wherein the security coating comprises from about 70% to about 99% by weight of a first mixture comprising (1) at least one diacrylate monomer, and (2) at least one triacrylate; from about 1% to about 30% by weight of at least one mono- or polyfunctional acrylate oligomer which may optionally contain internal flexible units; from 0% to about 10% by weight of at least one photoinitiator; and from about 0.001% to about 5% by weight of at least one taggant compound.

15. The label of claim 12, wherein the substrate layer comprises at least one of a polyolefin layer and a polyester layer.

16. A security label adherable to a product, comprising:

a substrate layer having an upper and a lower surface, and a security coating in contact with at least one of the upper and lower surfaces of the substrate layer, said security coating comprising:

from about 70% to about 99.999% by weight of a film forming material, and from about 0.001% to about 5% by weight of at least one taggant compound, wherein the taggant compound is substantially uniformly dispersed within the film forming material, and wherein said taggant compound fluoresces at a known wavelength within the range of 390 nm to 700 nm upon irradiation with ultraviolet light of said label and wherein said taggant is detectable without removing the label from the product.

17. The label of claim 16, wherein the adhesive material comprises at least one of a styrene-butadiene copolymer, a styrene-isoprene block copolymer, a random copolymer of ethylene and vinyl acetate, and an ethylene-vinyl-acrylic terpolymer.

18. The label of claim 16, wherein the adhesive material comprises an alkyl acrylate adhesive.

19. The label of claim 16, wherein the adhesive material comprises an alkyl methacrylate adhesive.

20. The label of claim 16, wherein the adhesive material comprises an ethylene vinyl acetate copolymer, a polyethylene wax and a tackifier.

21. A method of authenticating a product, comprising:

affixing a label to the product, the label comprising a substrate layer having an upper and a lower surface, and a security coating in contact with at least one of the upper and lower surfaces of the substrate layer, said security coating comprising:

from about 50% to about 99.999% by weight of a film forming material, and from about 0.001% to about 5% by weight of at least one taggant compound, wherein the taggant compound is substantially uniformly dispersed within the film forming material and wherein the taggant emits light of a known wavelength after being irradiated with light of a first wavelength;

irradiating the label with light of the first wavelength;

determining whether or not the label emits light of the known wavelength; and authenticating the product if the wavelength of the light emitted by the label is substantially the same as the known wavelength without altering the label or removing the label from the product.

22. The method of claim 21, wherein the security coating is one of an adhesive layer, a topcoat layer and a primer layer.

23. A method of making a label adherable to a product, comprising:

providing a substrate layer having an upper and a lower surface, and applying a security coating on at least one surface of the substrate layer comprising:

from about 50% to about 99.999% by weight of a film forming material, and from about 0.001% to about 5% by weight of at least one taggant compound, wherein the taggant compound is substantially uniformly dispersed within the film forming material, and wherein said taggant compound fluoresces at a known wavelength within the range of 390 nm to 700 nm upon irradiation with ultraviolet light of said label and wherein said taggant is detectable without removing the label from the product.

24. The label of claim 23, wherein the security coating is formed from a 100% solids system.

25. The label of claim 23, wherein the security coating is formed from a polymer emulsion.

26. The label of claim 23, wherein the security coating is formed from a solvent based polymer.

27. A label, comprising:

a substrate layer, and a security coating on at least one side of the substrate layer comprising:

from about 70% to about 99% by weight of a first mixture comprising at least one of glyceryl propoxylate diacrylate and glyceryl ethoxylate triacrylate; glyceryl ethoxylate diacrylate and glyceryl ethoxylate triacrylate; and neopentyl glycol propoxylate diacrylate and trimethoylolpropane propxylate triacrylate;

from about 1% to about 30% by weight of at least one mono- or polyfunctional acrylate oligomer which may optionally contain internal flexible units;

from 0% to about 10% by weight of at least one photoinitiator; and from about 0.001% to about 5% by weight of at least one taggant compound.

* * * * *